Patented Dec. 16, 1941

2,266,456

UNITED STATES PATENT OFFICE 2,266,456

METHOD OF OBTAINING DYE IMAGES

Lot S. Wilder, Rochester, N. Y., assignor to Eastman Kodak Company, Rochester, N. Y., a corporation of New Jersey No Drawing. Application December 26, 1940, Serial No. 371,795. In Great Britain January 19, 1940

4 Claims. (Cl. 95—6)

This invention relates to color photography and particularly to a process involving the oxidation of reduced dye forms incorporated in a photographic emulsion layer.

Many processes have been proposed for the incorporation of leuco forms of dyes in photographic layers, the leuco form being oxidized to the dye in the presence of a silver image. Most of these depend upon the use of an agent which oxidizes the leuco form to a dye in the regions of the silver image or a salt formed from the silver image, such as bromine or chlorine water, potassium bromate, sodium chlorate or other oxidizing agents. Proposals have also been made for mordanting the leuco form, or the dye formed from it, to the silver salt image formed during the oxidation. Other processes involve physical intensification of the silver image in a solution of silver nitrate which may or may not include a developing agent, and which oxidizes the leuco compound to the dye in the region of the silver image.

In many cases it is desirable to produce a positive color image by reversal. The prior art processes involving the use of reduced or leuco forms of dyes in emulsion layers do not describe a method for producing a positive dye image by reversal in which the resulting dye is fast to diffusion.

It is, therefore, an object of the present invention to provide a reversal process for the production of colored photographic images from reduced dye forms incorporated in a photographic emulsion layer. A further object is to provide a dye image which is not subject to diffusion and which, therefore, produces satisfactory color pictures. Other objects will appear from the following description of my invention.

I have found that a positive dye image sufficiently free from diffusion may be produced in a photographic layer containing a reduced dye form capable of conversion to a dye by oxidation, by oxidizing the reduced dye with a silver nitrate solution and that the dye thus formed may be washed out of the layer without affecting the unoxidized dye in the positive portions of the layer. The film may then be treated with an oxidizing mordanting bath which converts the reduced dye in the positive portions of the layer to the colored form of the dye and mordants it to the gelatin.

My process involves the following steps of treatment of a silver halide emulsion layer containing a reduced dye form capable of conversion to the dye by oxidation:

1. Exposure.
2. Development to negative silver.
3. Wash.
4. Oxidation of the reduced dye form to the dye with silver nitrate.
5. Wash to remove the oxidized dye.
6. Bleaching to oxidize the residual reduced dye to its colored form and mordant it to the gelatin.
7. Fixing.
8. Wash and dry.

In carrying out the invention, the dye forming substance is preferably incorporated in the emulsion layer during the manufacture thereon and the oxidation of this dye forming substance to the dye is effected after ordinary development of the silver image by treating the layer with a solution of a silver compound such as silver nitrate. The result is that physical intensification takes place inside of the layer by the mutual action of the metallic silver, the silver compound, and the dye forming substance. The developed silver image is intensied by silver deposited from the silver nitrate while the dye forming substance is oxidized to an extent depending upon the density of the silver image. When a leuco derivative of a dye is employed as the dye forming substance, the silver intensification obtained by the process may be very small. This is immaterial, however, because the silver intensification is only incidental to the process and the silver image as a whole is removed after the production of the colored image.

Suitable dye forming substances for use in my invention are, for example, derivatives of di- and triphenylmethanes and derivatives of xanthylium salts such as rhodamines and fluoresceins.

Specific examples of suitable leuco derivatives of dyes for use in my process are as follows where the color of the image obtained is shown on the right and C. I. stands for "Rowe's Colour Index."

Tetramethyl-diamido-diphenyl methane.
O-amino tetraethyl-diamido-triphenyl methane.
Leuco derivative of Brilliant Green (C. I. No. 662) (blue-green).
Leuco derivative of Malachite Green (C. I. No. 657) (green).
Leuco derivative of Magenta (C. I. 676)—magenta.
Leuco derivative of Crystal Violet (C. I. 681)—(bluish-violet).
Leuco derivative of Flavaniline (C. I. 803)—(yellow to orange).
Leuco derivative of rhodamine (C. I. 749)—(magenta).

Leuco derivative of fluorescein (C. I. 766)—(yellow).

For the production of multi-color images, two or more silver halide emulsions sensitized for suitable spectral regions may be separately mixed with suitable dye forming substances and arranged in known manner on a support of glass, cellulose ester, paper, or other material in the form of layers. Intermediate layers, for example, of gelatin may be coated between the superposed emulsion layers containing the leuco dyes and these layers may be colored with filter dyes capable of being washed out in the process.

The following example will illustrate one method of carrying out my invention:

A normal gelatino silver halide emulsion layer containing leuco malachite green was exposed and developed to a negative silver image by treatment for five minutes in a developer having the following composition:

| | |
|---|---|
| Monomethyl-p-aminophenol sulfate grams | 3.1 |
| Sodium sulfite do | 45 |
| Hydroquinone do | 12 |
| Sodium carbonate do | 67.5 |
| Potassium bromide do | 1.9 |
| Water to liter | 1 |

The film was washed for from 5 to 10 minutes and the leuco dye was oxidized to the dye by immersion for ten minutes in a 10% aqueous solution of silver nitrate. The film was then washed for from 5 to 10 minutes to remove the dye thus generated in the negative portions of the film and was then bleached for five minutes in one of the following:

| | |
|---|---|
| 1. Potassium dichromate grams | 5 |
| Hydrochloric acid conc do | 2 |
| Water to cc | 100 | followed by a fixing bath of acid hypo, or

| | |
|---|---|
| 2. Potassium ferricyanide grams | 5 |
| Potassium bromide do | 0.5 |
| Water to cc | 100 | followed by a fixing bath of acid hypo and then the following bleach bath for five minutes:

| | |
|---|---|
| Potassium dichromate grams | 5 |
| Sulfuric acid conc do | 2 |
| Water to cc | 100 |

The film was then cleared for five minutes in a 30% hypo solution, washed and dried.

The operation of my process depends upon the discovery that silver nitrate and similar silver salts will oxidize leuco dyes to their colored forms in the presence of finely divided silver and that the oxidizing action is directly proportional to the amount of silver present. My process further depends upon the discovery that the dyes in their oxidized colored forms are relatively soluble in water and that if the film is washed immediately following the formation of these dyes by the oxidation with silver nitrate, the dye may be washed from the layer without seriously affecting the unoxidized dye in the positive portions of the layer. If the film were dried before and after the silver nitrate treatment and if the element were left in the silver nitrate solution for only a short time, the diffusion of the dye formed in the negative portions of the layer would be materially decreased but still the dye would not be so fast to diffusion as in the case where it is mordanted to the gelatin.

The bleach baths described in the specific example above perform a three-fold function. First, it oxidizes the residual leuco dye to its colored form, second, it mordants the dye to the gelatin and prevents its diffusion and third, it removes the negative silver image. After removal of the unexposed silver halide there is left in the film a reversal dye image which will not readily wash out in water.

The compounds and modifications described herein are by way of example only and it is to be understood that my invention should be taken as limited only by the scope of the appended claims.

I claim:

1. A reversal process for the production of a colored photographic image in a layer of colloidal material containing a sensitive silver salt and a colorless, reduced dye form capable of conversion to a water-soluble dye by oxidation, which comprises exposing and developing the layer to form a metallic silver image therein, oxidizing the reduced dye form to the colored form in the regions of said silver image with a soluble silver compound, washing the layer to remove the dye thus formed without removing the reduced dye in the unexposed portions of the layer, and simultaneously oxidizing the reduced dye in said portions of the layer to the colored form and mordanting it to the colloid.

2. A reversal process for the production of a colored photographic image in a gelatino-silver halide layer containing a colorless leuco dye form capable of conversion to a water-soluble dye by oxidation, which comprises exposing and developing the layer to form a metallic silver image therein, oxidizing the leuco dye to the colored form in the regions of said silver image with a soluble silver compound, washing the layer to remove the dye thus formed without removing the leuco dye in the unexposed portions of the layer, and simultaneously oxidizing the leuco dye in said portions of the layer to the colored form and mordanting it to the gelatin.

3. A reversal process for the production of a colored photographic image in a gelatino-silver halide layer containing a colorless leuco dye form capable of conversion to a water-soluble dye by oxidation, which comprises exposing and developing the layer to form a metallic silver image therein, oxidizing the leuco dye to the colored form in the regions of said silver image with silver nitrate, washing the layer to remove the dye thus formed without removing the leuco dye in the unexposed portions of the layer, and simultaneously oxidizing the leuco dye in said portions of the layer to the colored form and mordanting it to the gelatin.

4. A reversal process for the production of a colored photographic image in a gelatino-silver halide layer containing leuco malachite green, which comprises exposing and developing the layer to form a metallic silver image therein, oxidizing the leuco dye to the colored form in the regions of said silver image with silver nitrate, washing the layer to remove the dye thus formed without removing the leuco dye in the unexposed portions of the layer, and simultaneously oxidizing the leuco dye in said portions of the layer to the colored form and mordanting it to the gelatin with an acid dichromate solution.

LOT S. WILDER.